(12) United States Patent
Ham et al.

(10) Patent No.: US 6,304,018 B1
(45) Date of Patent: Oct. 16, 2001

(54) EXTERNALLY-WOUND STATOR WITH IMPROVED MAGNETIC TRANSITION

(75) Inventors: Craig A. Ham, Miamisburg; Ralph J. Unterborn, Dayton, both of OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 08/590,274

(22) Filed: Nov. 21, 1995

(51) Int. Cl.$^7$ .................................................. H02K 15/02
(52) U.S. Cl. ............................................. 310/216; 310/254
(58) Field of Search ........................... 310/254, 258, 310/259, 179, 168, 42, 43, 216, 217

(56) References Cited

U.S. PATENT DOCUMENTS

| | | | |
|---|---|---|---|
| Re. 34,667 | 7/1994 | Neumann | 310/216 |
| 2,607,816 | * 8/1952 | Ryder et al. | 310/42 |
| 2,695,969 | * 11/1954 | Yates | 310/259 |
| 2,711,008 | * 6/1955 | Smith | 310/259 |
| 3,477,125 | 11/1969 | Schwartz | 29/596 |
| 3,489,938 | 1/1970 | Nakamura | 310/214 |
| 3,827,141 | * 8/1974 | Hallerback | 310/42 |
| 3,869,629 | 3/1975 | Ogawa et al. | 310/216 |
| 3,914,859 | * 10/1975 | Pierson | 310/42 |
| 4,025,840 | 5/1977 | Brissey et al. | 322/52 |
| 4,080,724 | 3/1978 | Gillette | 29/596 |
| 4,466,182 | 8/1984 | Lamatsch et al. | 29/598 |
| 4,591,766 | 5/1986 | Takaba | 318/254 |
| 4,780,635 | 10/1988 | Neumann | 310/216 |
| 4,801,832 | 1/1989 | Neumann | 310/216 |
| 4,818,905 | 4/1989 | Lender | 310/42 |
| 4,912,353 | * 3/1990 | Kondo | 310/259 |
| 4,937,485 | 6/1990 | Mihalko | 310/208 |
| 5,086,245 | 2/1992 | Sieja et al. | 310/216 |
| 5,111,096 | * 5/1992 | Horst | 310/168 |
| 5,134,327 | * 7/1992 | Sumi et al. | 310/43 |
| 5,173,629 | 12/1992 | Peters | 310/216 |
| 5,173,651 | 12/1992 | Buckley et al. | 318/701 |
| 5,306,976 | 4/1994 | Beckman | 310/215 |
| 5,313,131 | 5/1994 | Hibino et al. | 310/254 |
| 5,349,741 | 9/1994 | Neuenschwander | 29/598 |
| 5,382,860 | 1/1995 | Fanning et al. | 310/216 |
| 5,502,341 | * 3/1996 | Sato | 310/42 |

FOREIGN PATENT DOCUMENTS

| | | |
|---|---|---|
| 1763506 | 11/1971 | (DE) . |
| 9201325 | 8/1984 | (WO) . |

\* cited by examiner

Primary Examiner—Tran Nguyen
(74) Attorney, Agent, or Firm—Jacox, Meckstroth & Jenkins

(57) ABSTRACT

A stator core for a variable reluctance motor. The stator core having a number of stator lamina joined together in a direction along a longitudinal axis. Each of the stator lamina include a number of circumferentially spaced-apart pole pieces and a circular member joined to each of the pole pieces at an intermediate portion thereof so as to define a flanged portion which extends radially inwardly from the circular member.

22 Claims, 3 Drawing Sheets

EXTERNALLY-WOUND STATOR WITH IMPROVED MAGNETIC TRANSITION

BACKGROUND OF THE INVENTION

The present invention relates generally to a stator for a motor, and more particularly to an externally-wound stator with improved magnetic transition.

FIG. 6 is a perspective view of a known internally-wound stator core 10. The internally-wound stator core 10 includes a number of circumferentially spaced-apart pole pieces or teeth 12 which cooperate to defined radially inwardly opening slots 14 which receive coils of wire during a stator winding operation. The stator core 10 can be wound in one of two known techniques, either pre-winding the wire into coils and then inserting the coils radially outwardly into the slots 14 from a central bore 16 of the stator core 10, or using a needle to thread or wind the wire around the pole pieces 12 from within the slots 14.

A disadvantage associated with pre-winding a set of coils is that the wires that form the coils are susceptible to damage such as nicking and/or scraping the insulated coating that surrounds or encases the wires, when the coils are inserted around the pole pieces 12 and into the slots 14 from within the central bore 16. Damaged coil wires can electrically short to other coil wires thus reducing the wire turn count and causing excessive heat generation which may, inter alia, shorten the lifetime of the stator. A disadvantage associated with the needle winding technique is that there are limitations on the number of wire coils (the amount of wire fill) that can be wound around the pole pieces 12 because a certain amount of free space must be reserved in the slot 14 to permit the needle to enter and feed the next wire through the slot 14.

FIG. 7 is a perspective view of a known externally-wound stator core 20 which eliminates the potential for damaging the coil wires, and eliminates the wire fill limitation associated with the internally-wound stator core 10. The externally-wound stator core 20 includes a thin circular member 22 defining an inner diameter of the stator core 20, and a number of circumferentially spaced-apart pole pieces or teeth 24 which are individually joined to the member 22 at the radially innermost edges thereof. The purpose for the member 22 is to structurally retain the pole pieces 24 in a predetermined position so that the stator core 20 can be wound with coils of wire during a stator winding operation. The pole pieces 24 cooperate to defined radially outwardly opening slots 26 for receiving the coils of wire which are wound around the pole pieces 24 in a manner similar to winding an armature. It should be appreciated that a winding operation for an externally-wound stator core is faster and simpler than a winding operation for an internally-wound stator core.

One disadvantage of joining the radially innermost edges of the pole pieces 24 to the member 22 is that the sharp magnetic corners of the pole pieces 24 at the inner diameter of the stator core 20 are eliminated or at least substantially diminished. That is, the member 22 provides a continuous inner circumferential surface which does not permit abrupt changes in reluctance. Sharp magnetic transitions at the radially innermost edges of the pole pieces are required for variable reluctance motor technologies such as switched reluctance motors. However, the member 22, which is a structural feature of the stator core 20, provides a magnetic short circuit which may cause a significant amount of flux leakage when a predetermined set of coils is energized. With particular types of magnetic motors, the leakage is an acceptable consequence of the member 22. However, with variable reluctance motor technologies, the flux leakage is not acceptable as it directly affects torque production.

What is needed therefore is an externally-windable stator core which preserves the sharp magnetic corners of the pole pieces at the inner diameter of the stator core.

SUMMARY OF THE INVENTION

In accordance with one aspect of the present invention, there is provided a stator lamina having a number of spaced-apart pole pieces, and a member joined to each of the pole pieces at an intermediate portion thereof.

Pursuant to another aspect of the present invention, there is provided a stator core having a number of stator lamina joined together in a direction along a longitudinal axis wherein each of the stator lamina include a number of spaced-apart pole pieces and a member joined to each of the pole pieces at an intermediate portion thereof.

Pursuant to yet another aspect of the present invention, there is provided a motor including a stator core having a plurality of stator lamina joined together in a direction along a longitudinal axis wherein the stator lamina cooperate to define a central bore extending along the longitudinal axis, and wherein each of the stator lamina include a number of spaced-apart pole pieces and a member joined to each of the pole pieces at an intermediate portion thereof. The motor further includes a rotor mounted to rotate within the central bore.

Pursuant to still yet another aspect of the present invention, there is provided a method for winding a stator core including the steps of providing a stator lamina having a number of spaced-apart pole pieces and a member joined to each of the pole pieces at an intermediate portion thereof, providing outwardly opening slots defined by adjacent pole pieces and the member, and winding a wire coil around at least one of the pole pieces so that the wire extends within at least two of the outwardly opening slots.

It is therefore an object of the present invention to provide a new and useful stator lamina which includes a circular member which joins to an intermediate portion of each pole piece.

It is another object of the present invention to provide a new and useful externally-wound stator core which provides abrupt changes in reluctance at the radially inner ends of the pole pieces.

It is a further object of the present invention to provide a new and useful externally-wound stator core which permits higher wire fills than internally-filled stator cores.

It is yet another object of this invention to provide a new and useful externally-wound stator core which prevents the coil wires from being damaged during a winding operation.

It is still another object of the invention to provide a new and useful stator core which can be wound in a quick and easy manner with conventional armature winding equipment.

The above and other objects, features, and advantages of the present invention will become apparent from the following description and the attached drawings.

DETAILED DESCRIPTION OF THE PREFERRED EMBODIMENT

Figure 1:
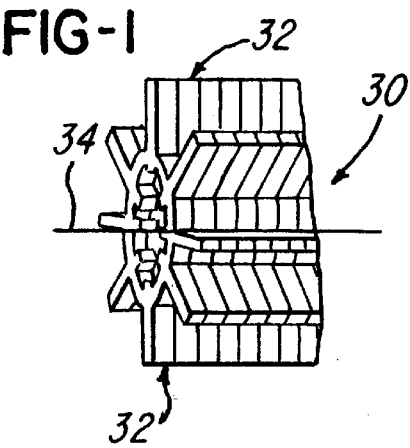
FIG. 1 is a perspective view of a portion of a stator core which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a perspective view of a stator core 30 which incorporates the features of the present invention therein. The stator core 30 includes a number of separate stator lamina 32 which are laminated together in a conventional manner so as to form the stator core 30. The stator lamina 32 are arranged in a back-to-back configuration in a direction extending along a longitudinal axis 34. The stator lamina 32 are laminated together in order to reduce eddy currents in a conventional manner. A typical lamination thickness is approximately 0.025 inches.

Figure 2:
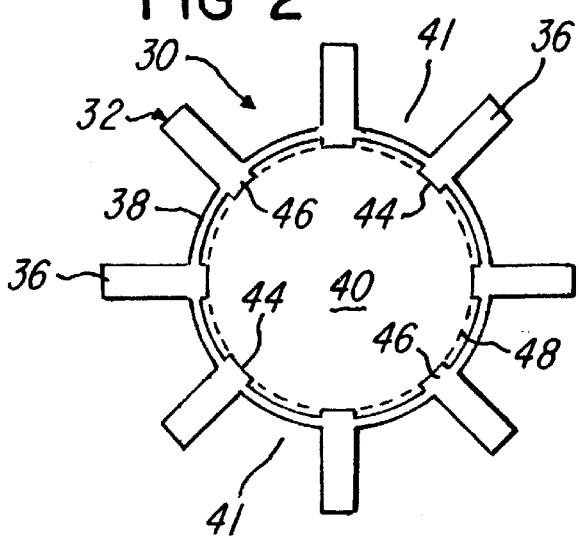
FIG. 2 is an end view of the stator core shown in FIG. 1.

As best seen in FIG. 2, each stator lamina 32 includes a number of circumferentially spaced-apart laminated steel pole pieces 36 which are joined together by a thin circular laminated steel member or web 38 at an intermediate portion of each pole piece 36. The pole pieces 36 and the member 38 cooperate to define a central bore 40 which extends along the longitudinal axis 34. The member 38 cooperates with two circumferentially-adjacent or consecutive pole pieces 36 to define radially outwardly projecting slots 41 for receiving coils of wire as described further below. In the embodiment being described, there are eight (8) circumferentially-spaced apart pole pieces 36 forming each stator lamina 32.

The pole pieces 36 each have a circumferentially-extending inner wall 44 which projects radially inwardly from the member 38 to define a flanged portion 46 of each pole piece 36. In addition, the inner walls 44 cooperate to define a stator core inner diameter 48. Thus, it should be appreciated that the member 38 is spaced radially outwardly from the stator core inner diameter 48. In the embodiment being described, the stator lamina 32 are stamped or formed from a permeable material such as low-carbon steel or silicon steel.

The purpose of the member 38 is to structurally retain the pole pieces 36 in a predetermined position so that the stator core 30, and more particularly, the pole pieces 36, can be externally wound with coils of wire during a stator winding operation. In addition, the member 38 permits the pole pieces 36 to be retained in a single rigid structure which maintains the relative positional accuracy of the pole pieces 36 during the stator winding operation.

Figure 3:
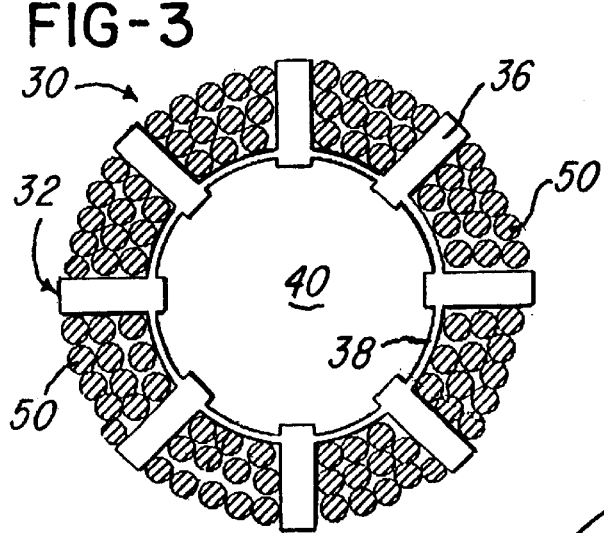
FIG. 3 is a cross-sectional view of the stator core shown in FIG. 1 with a plurality of wire coils wrapped around the pole pieces of the stator core.
Figure 4:
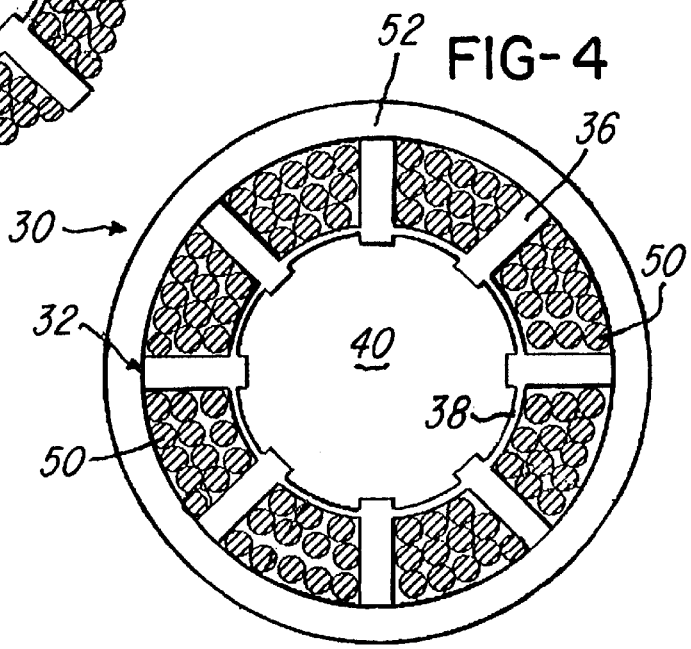
FIG. 4 is a cross-sectional view of a flux tube surrounding the stator core shown in FIG. 3.

Referring now to FIG. 3, once the stator core 30 is formed by joining the stator lamina 32 together, the stator core 30 may be externally wound with wire 50 such as a polyester-coated wire also referred to as magnet wire. In particular, the wire 50 passes through the slots 41 in a direction along the longitudinal axis 34 and over one or more pole pieces 36. In the embodiment being described there are approximately 10–12 turns of wire 50 per pole piece 36. Once the wire 50 has been wound onto the stator core 30, a back iron or laminated metal flux tube 52 is pressed or otherwise secured over the stator core as shown in FIG. 4. The flux tube 52 facilitates holding the pole pieces 36 in place and provides a return path for the magnetic lines of flux.

Figure 5:
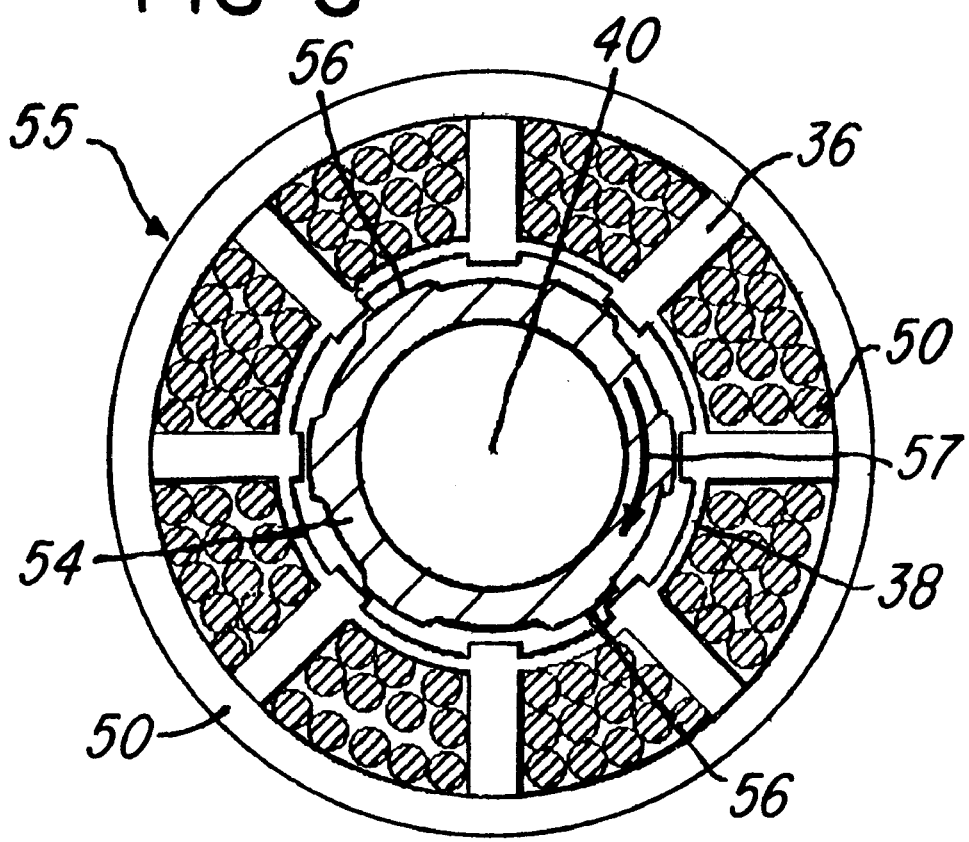
FIG. 5 is a cross-sectional view of a motor having a rotor assembly positioned within the stator core and flux tube shown in FIG. 4.
Figure 6:
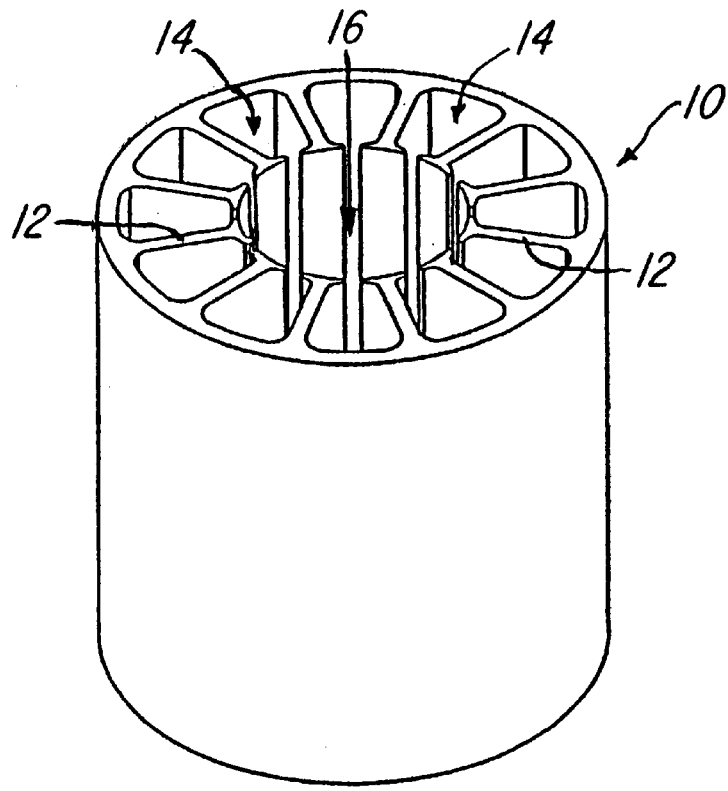
FIG. 6 is a perspective view of a prior art internally-wound stator core.
Figure 7:
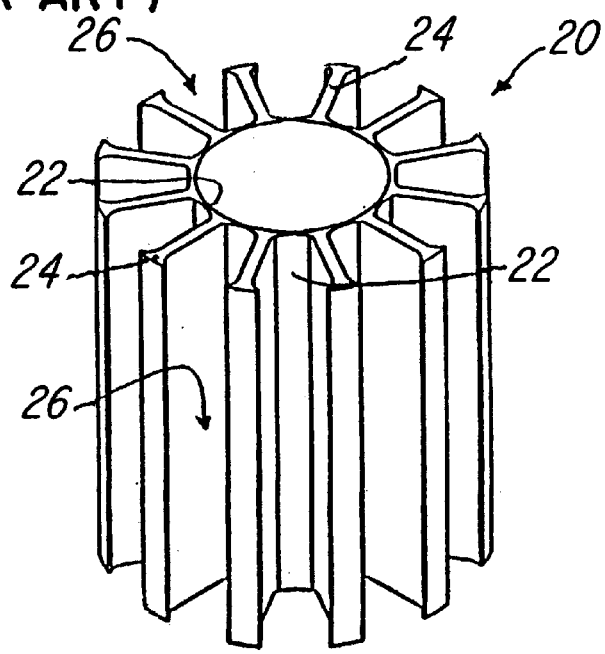
FIG. 7 is a perspective view of a prior art externally-wound stator core.

In order to reduce eddy currents, the flux tube 52 may be formed by joining annular lamina in a back-to back configuration in a direction along the longitudinal axis 34 in a manner similar to the stator core 30. After the flux tube 52 is pressed over stator core 30, a rotor assembly 54 is mounted to rotate within the central bore 40 to form a variable reluctance motor 55 such as a switched reluctance motor as shown in FIG. 5. The rotor assembly 54 has a number of radially outwardly projecting rotor teeth 56 which facilitate the rotation of the rotor assembly 54 within the central bore 40 as discussed further below.

In operation, the rotor assembly 54 is caused to rotate in a direction identified by the arrow 57.

That is, the rotation of the rotor assembly 54 is caused by a magnetic flux gradient between the flanged end portions 46 of the pole pieces 36 and the outwardly projecting rotor teeth 56 when opposing pole pieces 36 are selectively energized by current flow through the wire coils 50. The sharp magnetic corners or transitions of the pole pieces 36 result in a magnetic stress tensor that causes the rotor teeth 56 to be attracted to successively leading pole pieces 36. Thus, the sharp magnetic transitions are essential to adequate performance in the form of torque production of the variable reluctance motor 55.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, the stator core 30 could be wound in a lapped multi-pole configuration where the wire coils 50 are wound around multiple pole pieces 36 rather than a single pole piece 36. That is, the stator core 30 could have a coil span of more than one pole piece 36.

Also, the member 38 may be substantially circular in that each portion of the member 38 that joins together adjacent pole pieces 36 could be spaced at different radial positions relative to the remaining portions of the member 38.

In addition, the pole pieces 36 may be substantially circumferentially-spaced in that a cross-section of the stator lamina 32 could form a shape other than a circle such as a polygon.

What is claimed is:

1. A stator lamina comprising:
   a plurality of spaced-apart pole pieces; and
   a member joined to each of said plurality of pole pieces,
   wherein said member defines an inner surface,
   wherein each of said pole pieces includes a flanged portion which projects inwardly of said inner surface, and
   wherein said member defines a central bore area in which a rotor is rotatable positioned.

2. The stator lamina of claim 1, wherein each of said flanged portions includes an inner wall which is spaced radially apart from said member.

3. The stator lamina of claim 2, wherein said inner walls cooperate to define an inner diameter of the stator lamina.

4. The stator lamina of claim 1, wherein said member and two adjacent pole pieces cooperate to define an outwardly opening slot for receiving a wire coil.

5. The stator lamina of claim 1, further including eight circumferentially spaced-apart pole pieces.

6. A stator core comprising:
   a plurality of stator lamina joined together in a direction along a longitudinal axis; and
   said plurality of stator lamina each including a plurality of spaced-apart pole pieces, and a member joined to each of said plurality of pole pieces,
   wherein said member defines an inner surface,
   wherein each of said pole pieces includes a flanged portion which projects inwardly of said inner surface, and
   wherein said plurality of stator lamina cooperate to define a central bore in which a rotor is rotatable supported.

7. The stator core of claim 6, wherein each of said flanged portions includes an inner wall which is spaced apart from said member.

8. The stator core of claim 7, wherein said inner walls cooperate to define an inner diameter of said stator lamina.

9. The stator core of claim 6, wherein said member and two adjacent pole pieces cooperate to define an outwardly opening slot for receiving a wire coil.

10. The stator core of claim 6, wherein said plurality of stator lamina each include eight circumferentially spaced-apart pole pieces.

11. The stator core of claim 6, further including a plurality of wire coils wound around at least one of said plurality of pole pieces.

12. The stator core of claim 11, further including a flux tube surrounding said plurality of stator lamina.

13. A motor comprising:
   a stator core having a plurality of stator lamina joined together in a direction along a longitudinal axis;
   said plurality of stator lamina cooperating to define a central bore extending along said longitudinal axis;
   said plurality of stator lamina each including a plurality of spaced-apart pole pieces and a member joined to each of said plurality of pole pieces, wherein said member defines an inner surface and further wherein each of said pole pieces includes a flanged portion which projects inwardly of said inner surface; and
   a rotor mounted to rotate within said central bore.

14. The motor of claim 13, wherein each of said flanged portions includes an inner wall which is spaced apart from said circular member.

15. The motor of claim 14, wherein said inner walls cooperate to define an inner diameter of said stator lamina.

16. The motor of claim 14, wherein said member and two adjacent pole pieces cooperate to define an outwardly opening slot for receiving a wire coil.

17. The motor of claim 13, wherein said plurality of stator lamina each include eight circumferentially spaced-apart pole pieces.

18. The motor of claim 13, further including a plurality of wire coils wound around at least one of said plurality of pole pieces.

19. The motor of claim 13, further including a flux tube surrounding said stator core.

20. The motor of claim 13, wherein the motor is a variable reluctance motor.

21. The motor of claim 20, wherein said variable reluctance motor is a switched reluctance motor.

22. A method for winding a stator core comprising the steps of:
   providing a stator lamina having a plurality of spaced-apart pole pieces and a member joined to each of said plurality of pole pieces, wherein (1) said member defines an inner surface, (2) each of said pole pieces includes a flanged portion which projects inwardly of said inner surface, and (3) said member defines a central bore area in which a rotor is adapted to rotate;
   providing outwardly opening slots defined by adjacent pole pieces and said member; and
   winding a wire coil around at least one of said pole pieces so that said wire extends within at leas t two of sa id outwardly opening slots.

* * * * *